(12) United States Patent
Baranowski et al.

(10) Patent No.: US 11,180,200 B2
(45) Date of Patent: Nov. 23, 2021

(54) COMPONENT FOR A MOTOR VEHICLE, AND METHOD FOR MANUFACTURING A COMPONENT FOR A MOTOR VEHICLE

(71) Applicant: Ford Global Technologies, LLC, Dearborn, MI (US)

(72) Inventors: Thomas Baranowski, Würselen (DE); Maik Broda, Würselen (DE); Markus Franzen, Stolberg (DE); Pascal Rebmann, Weilerswist (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 3 days.

(21) Appl. No.: 16/569,786

(22) Filed: Sep. 13, 2019

(65) Prior Publication Data
US 2020/0086930 A1    Mar. 19, 2020

(30) Foreign Application Priority Data

Sep. 14, 2018   (DE) .......................... 102018215665.4

(51) Int. Cl.
*B62D 29/00*   (2006.01)
*B62D 29/04*   (2006.01)
(Continued)

(52) U.S. Cl.
CPC .............. *B62D 29/001* (2013.01); *B60K 1/04* (2013.01); *B60R 9/052* (2013.01); *B62D 29/008* (2013.01);
(Continued)

(58) Field of Classification Search
CPC .... B62D 25/06; B62D 29/001; B62D 29/004; B62D 29/008; B62D 29/04; B29C 45/0005; B29C 45/14; B29L 2031/3002
(Continued)

(56) References Cited

U.S. PATENT DOCUMENTS 6,983,984 B2 *   1/2006   Garceau ................. B62D 25/06
                                                                    105/397
2006/0290154 A1 * 12/2006   Stapleton ................. B60R 9/04
                                                                     296/3
(Continued)

FOREIGN PATENT DOCUMENTS

DE   102013003538 A1   9/2014
DE   102013019677 A1   5/2015
(Continued)

OTHER PUBLICATIONS

English translation of DE 10 2013 019 677; retrieved Jun. 4, 2021 via PatentTranslate located at www.epo.org. (Year: 2021).*

*Primary Examiner* — Jason S Daniels
(74) *Attorney, Agent, or Firm* — David Coppiellie; Carlson, Gaskey & Olds, P.C.

(57) ABSTRACT

A disclosed component for a motor vehicle includes a component main body, with at least one reinforcing element integrated in a component matrix of the component main body. The at least one reinforcing element may be fastened to the component main body. The component for a motor vehicle has a high component stability, is able to be manufactured with relatively low production costs and enables integration of functional components. The component includes the reinforcing element as a band with a plastics matrix and embedded unidirectionally oriented continuous fibers. A method for manufacturing such a component is also disclosed.

17 Claims, 6 Drawing Sheets

(51) Int. Cl.
  *B60R 9/052* (2006.01)
  *B60K 1/04* (2019.01)
  *B62D 25/06* (2006.01)
  *B60B 35/00* (2006.01)
  *B60N 3/02* (2006.01)
  *B29L 31/30* (2006.01)
  *B29K 77/00* (2006.01)

(52) U.S. Cl.
  CPC .......... *B62D 29/04* (2013.01); *B29K 2077/00* (2013.01); *B29L 2031/3002* (2013.01); *B60B 35/00* (2013.01); *B60N 3/02* (2013.01); *B62D 25/06* (2013.01)

(58) Field of Classification Search
  USPC .................... 296/185.1, 187.13, 193.12, 210
  See application file for complete search history.

(56) References Cited

U.S. PATENT DOCUMENTS

| | | | | |
|---|---|---|---|---|
| 2010/0187865 | A1* | 7/2010 | Malek | C08L 77/00 296/203.03 |
| 2011/0204611 | A1* | 8/2011 | Ziegler | B29C 70/86 280/781 |
| 2015/0097395 | A1* | 4/2015 | Faruque | B62D 21/15 296/187.12 |
| 2016/0016614 | A1* | 1/2016 | Conze | B29C 43/18 296/193.12 |
| 2018/0037273 | A1 | 2/2018 | Aarts et al. | |
| 2020/0307708 | A1* | 10/2020 | Beil | B62D 29/005 |

FOREIGN PATENT DOCUMENTS

| | | |
|---|---|---|
| DE | 102015201712 A1 | 8/2016 |
| DE | 102015208963 A1 | 11/2016 |

* cited by examiner

COMPONENT FOR A MOTOR VEHICLE, AND METHOD FOR MANUFACTURING A COMPONENT FOR A MOTOR VEHICLE

CROSS REFERENCE TO RELATED APPLICATION

This application claims priority to German Application Serial No. DE 102018215665.4 filed on Sep. 14, 2018, the entirety of which is herein incorporated by reference.

TECHNICAL FIELD

The present disclosure relates to a component for a motor vehicle, having a component main body with a component matrix having at least one integrated reinforcing element integrated or at least one reinforcing element fastened to the component main body.

BACKGROUND

Weight reduction plays an important role in the development of components for vehicles because of the positive gains in reducing fuel or energy consumption while operating the vehicle. Specifically with a view to the development of environmentally friendly and fuel-saving motor vehicles, a reduction in the weight of vehicle components is therefore of very great interest. Even today, many components of a motor vehicle are still being produced from metallic materials. Metals certainly have a relatively high mechanical stability, yet also a relatively high weight. Though aluminum has a lower weight in comparison to steel, the production of aluminum components is, however, frequently associated with higher production costs. An alternative is offered by fiber-reinforced plastics. A direct integration of functional components into specific vehicle components, alongside a simultaneous reduction in the complexity of the components, is desirable. By way of example, the integration of lighting or heating elements should be cited.

SUMMARY

A component for a motor vehicle according to an exemplary aspect of the present disclosure includes, among other things, a component main body including a component matrix and a fixing element. A reinforcing element is integrated into the component matrix and is attached to the fixing element.

In a further non-limiting embodiment of the foregoing component for a motor vehicle, the reinforcing element comprises a unidirectional band that is wound around a portion of the fixing element and placed under a tensile stress.

In a further non-limiting embodiment of any of the foregoing components, the fixing element includes a connecting component.

In a further non-limiting embodiment of any of the foregoing components, the fixing element comprises one of a steel and aluminum.

In a further non-limiting embodiment of any of the foregoing components, the component comprises a roof transverse arch and the fixing element is provided at ends of the transverse arch for connection to a vehicle roof structure.

In a further non-limiting embodiment of any of the foregoing components, the component comprises a vehicle roof attached to the roof transverse arch.

In a further non-limiting embodiment of any of the foregoing components, the vehicle roof and the roof transverse arch form common component.

In a further non-limiting embodiment of any of the foregoing components, the component comprises a roof rack.

In a further non-limiting embodiment of any of the foregoing components, the component comprise a vehicle axle member and the reinforcing element is wrapped around the fixing element.

In a further non-limiting embodiment of any of the foregoing components, the component comprises a handle, the fixing element is formed of metal, the reinforcing element comprises a unidirectional tape wrapped around the fixing element and the fixing element and reinforcing element are overmolded within the component matrix.

In a further non-limiting embodiment of any of the foregoing components, the reinforcing element is electrically conductive and is coupled to a power source for inducing an electric current into the reinforcing element to heat the handle.

In a further non-limiting embodiment of any of the foregoing components, a contact penetrates the component matrix into electrical communication with the electrically conductive reinforcing element.

In a further non-limiting embodiment of any of the foregoing components, the component comprises a housing for a battery module and the reinforcement element is a unidirectional tape formed from an electrically conductive material.

In a further non-limiting embodiment of any of the foregoing components, the unidirectional tape includes a connection to an external power source to communicate electric power and heat the housing.

In a further non-limiting embodiment of any of the foregoing components, the reinforcement element comprises a thermoplastic matrix with a plurality of unidirectionally orientated fibers.

In a further non-limiting embodiment of any of the foregoing components, the unidirectionally orientated fibers comprise an electrically conductive carbon material.

A method of producing a component for a motor vehicle according to another exemplary aspect of the present disclosure includes, among other things, providing a plastic semi-finished structure, arranging a fixing element proximate the semi-finished structure, wherein the fixing element includes a connector, arranging at least one at least one reinforcing element proximate the plastics semi-finished structure and the fixing element, wherein the reinforcing element is a band, which comprises a plastics matrix embedded with unidirectionally oriented continuous fibers, and overmolding the semi-finished product along with the at least one reinforcing element.

In a further non-limiting embodiment of the foregoing method, the reinforcing element is fixed to the fixing element before overmolding, wherein fixing of the reinforcing element comprises wrapping a portion of the band around a portion of the fixing element.

In a further non-limiting embodiment of any of the foregoing methods, including arranging the fixing element such that a portion of the fixing element is not overmolded.

In a further non-limiting embodiment of any of the foregoing methods, the band comprises a unidirectional tape and the unidirectionally oriented continuous fibers comprise an electrically conductive carbon material.

The various features and advantages of this disclosure will become apparent to those skilled in the art from the following detailed description. The drawings that accompany the detailed description can be briefly described as follows.

DETAILED DESCRIPTION

Figure 1:
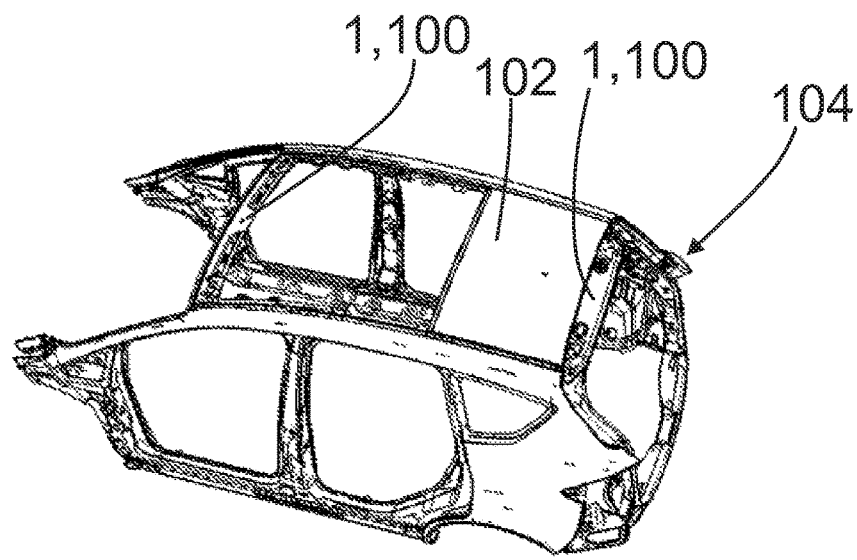
FIG. 1 is a perspective partial view the structure of a vehicle chassis, in particular in the region of the vehicle roof.

A disclosed embodiment is to provide a component for a motor vehicle, which has a high component stability, is able to be manufactured with relatively low production costs and allows the integration of functional components. In addition, a disclosed embodiment provides a method for manufacturing such a component.

A disclosed component of the type stated in the introduction includes a reinforcing element that is a band. The band comprises a plastics matrix with unidirectionally oriented continuous fibers embedded therein.

According to an example embodiment of this disclosure, a component for a motor vehicle includes a component main body, wherein at least one reinforcing element is integrated in a component matrix of the component main body. Alternatively, a reinforcing element can be fastened to the component main body. In particular, the at least one reinforcing element is constituted by a band that comprises a plastics matrix with embedded unidirectionally oriented continuous fibers. The at least one reinforcing element or band leads to an increase in the rigidity and stability of the component. In comparison to a component which is made of a fiber-reinforced solid material, a band reinforced with bands is associated with significantly lower manufacturing costs.

Example bands of this disclosure are also referred to as unidirectional (UD) tapes. A UD tape can have a thermoplastic plastics matrix, in which the unidirectionally oriented fibers are embedded. The fibers can be constituted, for instance, by carbon fibers. Since carbon fibers are electrically conductive, UD tapes having carbon fibers are suitable for the implementation of further functional characteristics into a component reinforced with a UD tape. For example, it is within the contemplation of this disclosure to apply an electric voltage to an electrically conductive UD tape and thus utilize this same as a heating element. For, through the application of an electric voltage, the UD tape heats up, transfers the herein generated heat to its surroundings. If such a UD tape is integrated in a component, the heat is transferred to the component. If the component comprises, for example, by a handle, the use of a UD tape integrated in the handle material or fastened to the handle enables a heating of the handle, it thus provides a handle heating facility.

Furthermore, this disclosure relates to a method for manufacturing a component for a motor vehicle. One disclosed example method comprises the following steps. Providing a plastics semi-finished product and arrangement and/or fastening of at least one reinforcing element on or to the plastics semi-finished product. In one disclosed example, the reinforcing element is a band, which comprises a plastics matrix and unidirectionally oriented continuous fibers embedded therein. The arrangement of the component parts joined together can be conducted in a die of an injection mold. The method may also include overmolding of the semi-finished product, along with the at least one reinforcing element, with an injection molding compound, in particular a plastics compound. This method is constituted by a method for manufacturing a composite component. The component assembly consists in the combination of a predefined plastics semi-finished product, the therein integrated reinforcing element, and the injection molding compound injection molded or overmolded onto the semi-finished product or onto the at least one reinforcing element.

The example disclosed method can be modified such that, prior to the arrangement and/or fastening of the at least one reinforcing element, at least one fixing or deflection element is arranged on and/or fastened to the semi-finished product. The at least one reinforcing element is fixed to the at least one fixing or deflection element or bears against this same. The fixing or deflection element can here be made of plastic or metal.

Furthermore, a disclosed method includes a method for manufacturing a component for a motor vehicle, comprising the steps of arranging and/or fastening of at least one reinforcing element in a die of an injection mold and overmolding of the reinforcing element with an injection molding compound, in particular a plastics compound.

The example method can be modified such that the at least one reinforcing element, jointly with at least one fixing or deflection element, is arranged and/or fastened in the die, wherein the at least one reinforcing element is fixed to the fixing or deflection element or bears against this same. Unlike the other disclosed methods, the reinforcing element, and optionally the fixing or deflection element is arranged directly in a die of an injection mold, thus no prior arrangement and/or fastening onto a prefabricated semi-finished product takes place. Rather, the composite component, is produced by means of a single injection molding operation. In such an example method, the semi-finished product must firstly be produced in a separate process. The process for producing the semi-finished product is not, however, the subject of the present disclosure.

Advantageous embodiments of this disclosure are defined in the claims and the following description of advantageous embodiments. In order to avoid repetitions, those advantageous embodiments of the component are equally considered as advantageous design variants of the method according to this disclosure. The advantageous embodiments thus equally relate to the component and to the disclosed manufacturing method.

According to one advantageous embodiment, the reinforcing element is a UD band or UD tape. In the component, a plurality of such UD tapes can be provided. A UD tape of this kind is constituted by a band having unidirectionally oriented reinforcement fibers, wherein the fibers are embedded in a plastics matrix, for instance a matrix of a thermoplastic plastic. A UD tape can here be of single-layer or multilayer construction. Laminates which are composed of a plurality of UD tape layers have an additionally increased mechanical stability and load-bearing capacity. UD tapes are amenable to thermal deformation and can be coated or overmolded by means of an injection molding process. The fibers are preferably constituted by continuous fibers. As the fibers, carbon fibers, glass fibers, mineral fibers, cement fibers, textile fibers, aramid fibers, natural fibers and metal fibers can enter into consideration.

According to a further advantageous embodiment, in the component matrix can further be integrated at least one fixing or deflection element. In the production of the composite component, the band of the composite component is fixable to the fixing or deflection element and bears against the fixing or deflection element. With such a fixing or deflection element or a plurality of such fixing or deflection elements, the UD band or a plurality of UD bands, can be arranged in a positionally fixed manner on a provided semi-finished product or in a die prior to the final production of the component, i.e. prior to the overmolding with a plastics compound. The UD band can be brought into a desired position by the fixing or deflection element and fixed in advance. Since the fixing or deflection elements are likewise a component part of the component (after the overmolding), these can likewise contribute to the mechanical stability of the component, for instance to the dispersal of forces generated in the course of travel or when the component is subjected to load. The fixing or deflection elements can also be only partially overmolded by the plastics compound by means of the overmolding process, so that the fixing or deflection elements can have the function of a fastening element for the component. Correspondingly, the fixing or deflection elements can be connected to other components or vehicle components. Correspondingly, the fixing or deflection element can be configured to attach the component to further components of a motor vehicle. For example, at those points on the fixing or deflection element which are not overmolded with additional plastics compound, fastening elements, fastening surfaces or fastening anchors can be provided. Fastening elements can be, for instance, hole openings, weldments, bolts or rivets. Fastening surfaces can be flat surfaces which are provided, in particular, for the application of adhesives and can thus produce an adhesive bond.

According to another advantageous example embodiment, the fixing or deflection element can be set up to procure a change of direction of the band in the component matrix. In particular, an at least partially rounded embodiment of the fixing or deflection element is suitable. To this end, the element can have a (partially) cylindrical bearing surface, along which the UD band can be guided with a change of direction. If the band is guided under a certain tensile stress around a plurality of deflection elements, or guided along a plurality of deflection elements, a multiplicity of band arrangements and, as it were, a stable fastening of the UD band are enabled.

According to another advantageous embodiment, the band can be electrically conductive. To this end, the band can have electrically conductive fibers. Here, fibers which consist directly of an electrically conductive material, for instance carbon fibers, can be used. However, a coating of an inherently non-conductive fiber material with an electrically conductive coating material can enter into consideration. For instance, the fibers can be supplied with a metal coating. Alternatively or additionally, electrically conductive filling materials can be integrated in the plastics matrix. It is conceivable, moreover, to use an electrically conductive plastic. As the electrically conductive filling materials, metal particles or short metal fibers, for instance, can enter into consideration.

The band can be connected via contact means to an electrical voltage source. The voltage source can be part of a vehicle electronics system or energy supply system which is present in a motor vehicle. The contact means can be directly connected to the electrically conductive fibers, to the electrically conductive plastics, and hence to the electrically conductive plastics matrix.

As one example contact means, a contact unit provided with metallic pins can be utilized. Individual metallic pins can also be provided as contact means. The pins can be made, for instance, of copper, bronze or brass. The pins can also be made of other materials and coated with a conductive material. Possible coating materials are in this case gold, silver, tin and chromium. A leading criterion in the selection of the pin material is the guarantee of a stable contact resistance.

The contact unit or metallic pins can be arranged in the style of a clamp and can make contact with the UD band by clamping action. In this case, the contact unit can be configured as a clamp provided with contact pins. The clamp can be constituted, for instance, by a spring force clamp or a terminal screw. The metallic pins can be tapered in the direction of the UD tape and have a tooth-like shape. It is thereby ensured that the contact pins can be inserted through the plastics matrix without great expenditure of force in order to make direct contact with the electrically conductive fibers or the plastics matrix. Contact means can also be a simple electrically conducting cable which is soldered to the UD tape or is bonded with an electrically conducting adhesive.

According to another advantageous embodiment, the component can be heatable with application of an electric voltage to the band. Through the application of the electric voltage, the electrically conductive fibers, the electrically conductive filling materials or the plastics matrix of the UD tape heat up. The herein generated heat is transferred to the surroundings. The UD tape can thus act as a heating element of the component, but can at the same time perform a stabilizing function for the component. The UD tape thus embraces several functional tasks for the appropriate component.

According to another advantageous embodiment, the component can be produced by overmolding of a prefabricated semi-finished product with an injection molding compound, preferably a plastics compound. The band and/or the fixing or deflection element, prior to the overmolding, can here be connected to the semi-finished product. In this way, a desired band arrangement in the component is able to be realized. The band arrangement can here be geared to a maximization of the component stability or to a desired heating of the component.

According to a further advantageous embodiment, the component can be constituted by a transverse arch of a vehicle roof, a vehicle roof, a vehicle axle, a grab handle, a handle for a parking brake or hand brake, a roof rack, or a housing of a battery module. Below, individual advantageous embodiments are explained in detail with reference to the aforementioned components.

The component can be constituted by the transverse arch of a vehicle roof. Roof transverse arches are generally arranged between the A, B and C-pillars of motor vehicles. Transverse arches on the one hand support the vehicle roof, and on the other hand contribute decisively to the flexural and torsional rigidity of the vehicle chassis. A rear roof transverse arch can further be fastened the tailgate of a vehicle. In relation to known roof transverse arches made of steel or extruded aluminum, a roof transverse arch according to the present disclosure has significant advantages in terms of its component weight. A roof transverse arch reinforced with UD tapes also has advantages in comparison to roof transverse arches made of carbon fiber reinforced plastic, in particular with regard to the production costs.

A roof transverse arch as a component according to one disclosed embodiment comprises a component main body made of plastic, preferably a thermoplastic plastic. Integrated in this are one or more UD tapes. Also integrated in the component main body are metallic fixing or deflection elements. However, these are not fully surrounded by the plastics compound providing the component matrix. At the uncovered points, the elements can be welded to other components of the vehicle, for instance by spot welding. It is advantageous if the UD tapes are wound all the way round the fixing and deflection elements. As a result, forces which are generated during travel or in the event of a crash can be dispersed particularly efficiently. Furthermore, on the fixing or deflection elements can additionally be provided T-shaped connecting elements, which enable a particularly good connection to the overmolded plastics compound.

A roof transverse arch as a component according to an example embodiment is able to be manufactured, in particular, by a desired number of fixing or deflection elements being positioned or arranged in a die. Around the fixing or deflection elements which are placed there, one or more UD tapes are arranged, or the tapes are fixed to the elements. The arrangement of the tapes can be realized prior to the insertion of the fixing or deflection elements into the die, or in the die itself. The UD tapes are fastened, with the application of a certain tensile stress, to the fixing or deflection elements. Subsequent thereto, the fixing or deflection elements, and the thereto connected UD tapes, are overmolded by a plastics compound. Ideally, the plastics compound consists of the same plastic as the plastics matrix of the UD tape. As a result, in the overmolding, a particularly good connection between the components can be obtained. Following conclusion of the injection molding operation, the component is cooled and removed from the die.

Alternatively, the production of the roof transverse arch is also possible through the provision of a plastics semi-finished product to which the fixing or deflection elements, along with the UD tapes, are connected. The semi-finished product, along with fixing or deflection elements and UD tapes, can be overmolded by a plastics compound by injection molding. The semi-finished product can be constituted by an organic sheet. The semi-finished product can have reinforcing ribs. Furthermore, additional reinforcing ribs of the component can be formed by means of the injection molding or overmolding. It should further be borne in mind that the semi-finished product or the component can also be configured as a hollow body. As the manufacturing process, a gas-mediated or water-mediated injection molding are within the contemplation of this disclosure. In addition, the semi-finished product or the component can be formed of a rigid foam, in particular a polymer foam. By means of the overmolding", additional functional elements, for instance sensors or cables, can be integrated into the component.

The plastics compound used in the injection molding of the component can comprise, for instance, polyamide or polypropylene. Included in the plastics compound or injection molding compound can be short or long glass fibers or carbon fibers. These can be a filling material or an additive.

As an alternative to the use of a UD tape as the reinforcing element, a band reinforced with biaxially oriented fibers can also be used. Similarly, bands having multi-axially oriented fibers can be suitable for use as a reinforcing element.

The component can be constituted by a vehicle roof. A vehicle roof is typically positioned above the transverse arches of the vehicle roof. At its marginal regions extending in the vehicle longitudinal direction, the vehicle roof is generally fastened to roof rails. In vehicle roofs, weight reduction has an increasingly important role to play. In particular, since the vehicle roof is a relatively large vehicle component which potentially makes a significant contribution to the overall weight of the vehicle. A vehicle roof will have certain basic stability and rigidity, in particular a strong flexural and torsional rigidity. A drawback with such a configuration is the relatively high price. In the case of metallic roofs, it is disadvantageous that visible welding points must be covered with additional coverings. Also, the fastening of the roof to the transverse arches represents an additional work step or production step.

Correspondingly, a vehicle roof too can be construed as a component within the meaning of this disclosure. In a component main body, thus a roof main body, reinforcing elements, for instance UD tapes, can be integrated. Furthermore, fixing or deflection elements can be integrated in a component matrix of the roof or be fastened to the component. The vehicle roof is manufactured together with the roof transverse arches as a common component in that the reinforcing elements and the fixing and deflection elements are placed in a die and overmolded by a plastics compound. The die can be tailored to the desired shape of the vehicle roof and, where appropriate, of the transverse arches.

Further details and characteristics of the previously described manufacture of the roof transverse arches apply analogously to the production of the vehicle roof, in particular when the roof transverse arches and the vehicle roof are produced as a common component. It should be appreciated that by means of injection molding, further functional elements can be integrated into the vehicle roof. These are then likewise arranged in the die and overmolded by the plastics compound. For instance, the additional elements can be constituted by a rear spoiler, aerodynamic components, tail lights, brake lights, attachment points for antennae, water nozzles for rear window wipers, attachment points for the rear window wipers, interior lighting elements, along with cablings and three-dimensional structures in the style of a "bubble roof".

In addition, the component can be constituted by a transparent vehicle roof. A transparent vehicle roof can also be produced together, in a single manufacturing process, with the roof transverse arches, analogously to the previously described constructions. Unlike a non-transparent roof, a transparent roof comprises a component main body made of a transparent, thermoplastic plastic. Polymethyl methacrylate (PMMA) or polycarbonate (PC), for instance, can enter into consideration. Analogously to the preceding constructions, fixing or deflection elements made of steel or aluminum are a component part of the roof. Furthermore, the roof is reinforced by the arrangement of UD tapes. A particularity of a transparent roof is the possibility of integrating a transparent organic LED display (tOLED or TOLED) into the roof. In order to avoid negative influencing of the driver during travel, such a display shall preferably be provided in the rear region of the vehicle roof.

The component can further be constituted by a vehicle axle, in particular by an axle beam running in the transverse direction of the vehicle. Axle beams or vehicle axles are generally produced from steel, aluminum or magnesium, thus of metal. Metallic axle beams are frequently overmolded by thermoplastic plastics in order to enable or to facilitate an attachment of functional elements to the axle. Control columns, consoles, heating and ventilation devices, and air conditioning systems, for instance, can be attached. This listing is not definitive. In the development of vehicle axles too, a weight reduction is of growing interest. Instead of the aforementioned metallic hybrid structures for axle beams, these can equally be produced from a thermoplastic plastic and be reinforced with reinforcing elements such as UD tapes. Such an axle or such an axle beam comprises a component main body made of thermoplastic material. Furthermore, fixing or deflection elements made of aluminum are integrated in the component main body or an associated component matrix, similarly UD tapes are a component part of the axle beam. These are likewise integrated in the component matrix. The tapes and fixing or deflection elements are, in a single step, overmolded by a plastics compound, namely by means of an injection molding process. Also in a vehicle axle as a component according to this disclosure, the reinforcing elements integrated in the component, in the form of UD tapes, are wound around the fixing or deflection elements and, as a result of the wrapping, undergo a change of direction or reversal of direction. The fixing or deflection elements ensure a positionally accurate arrangement of the tapes prior to the injection molding process and enable a stable fixing of the tapes.

The component can also be constituted by a grab handle for arrangement in the vehicle interior. The grab handle can here be arranged on the vehicle roof or on a vehicle pillar. Such grab handles are generally made of plastic and have a large wall thickness in order to ensure a sufficient mechanical stability and rigidity. As a result, the component weight is disadvantageously increased. According to an embodiment of this disclosure, such plastics grab handles can also be reinforced with a unidirectional band (UD tape). As a result, the wall thickness can be reduced and savings made in respect of component weight, while the stability remains constant. The UD tape can extend from one end of the grab handle to another end of the grab handle. Such a component is produced by injection molding. To this end, in a die, metal connecting elements can be connected to the tape ends and overmolded with an injection molding compound, preferably with a plastic. Via the connecting elements, the grab handle can be connected to the vehicle, for instance to the vehicle roof.

In the installed state of the grab handle, the UD tape can be connected via a contact means to an electrical voltage source. The voltage source can be a component part of the vehicle electronics. For this application, in particular unidirectional carbon fibers which are embedded in an electrically conductive plastics matrix are suitable. The plastics matrix can be made, for instance, of polyamide or polypropylene. Polyoxymethylene and polycarbonate/acrylonitrile butadiene styrene can also enter into consideration as the matrix materials. In these can be integrated electrically conductive filling materials. Following the application of an electric voltage to the UD bands arranged in the component, more specifically the grab handle, these heat up and transfer the herein generated heat to their surroundings.

The component can be constituted by the handle for a parking brake or hand brake of a motor vehicle. One or more bands, in particular UD bands having integrated electrically conductive fibers, can here be arranged on a thermoplastic semi-finished product and overmolded with a plastics compound. For instance, two of such UD bands can be arranged parallel to one another on the top side of a handle main body (this likewise provides the semi-finished product). At their ends, the parallel arranged bands can be connected to one another via electrical conductive connecting means. In the installed state, the band arrangement is connected via a contact means to an electrical voltage source. The voltage source can be a component part of the vehicle electronics. For this embodiment, unidirectional carbon fibers which are embedded in an electrically conductive plastics matrix are suitable. The plastics matrix can be made, for instance, of polyamide or polypropylene. In this, electrically conductive filling materials can be integrated. Following the application of an electric voltage to the UD bands arranged in the composite component, more specifically the handle of the parking brake or hand brake, these heat up and transfer the herein generated heat to their surroundings. In order to transport the heat outward as efficiently as possible, i.e. in the direction of the surface of the handle, and at the same time to ensure an acceptable handle, the handle can be at least partially encased by a thermally conductive elastomer. A thermally conductive elastomer of this kind has a 5 to 75 times greater thermal conductivity than conventional elastomers.

The component can also be constituted by a roof rack. A fundamental component part of a roof rack are transverse struts. Transverse struts extend over the vehicle roof and may be fastened via suitable adapters to the roof structure of the vehicle such as a roof railing. The transverse struts, as also the adapters, are generally made of metal. According to the disclosure, the roof rack, thus the transverse struts along with adapter as the plastic component, can be configured with therein integrated UD tapes as reinforcing elements. The UD tape can here extend along the transverse strut and be additionally fixed in the adapters. The production is realized by injection molding through overmolding of the UD tape.

In the component, additional ribs, which further increase the rigidity of the component, can be provided. The ribs can likewise be formed by injection molding, for instance through the use of an appropriate die. Advantageously, the UD tape is arranged under a specific tensile stress in the roof rack. Furthermore, the UD tape can extend along a core element likewise integrated in the roof rack or wound around the element. The core element can be constituted by a foam core, which, during the injection molding, jointly determines the shaping of the roof rack which is to be produced. Incidentally, it is also within the contemplation of this disclosure that the UD tape can also be integrated in a roof rack by means of "additive manufacturing".

Furthermore, in another example embodiment, the component can be a housing of a battery module. The battery module can be constituted, for instance, by a battery module for an electric vehicle. A plurality of battery units can here be amalgamated into a battery module and arranged in the housing. Such housings are generally produced from plastic or metal. A strong stability is desired in order to protect the content of the housing—the battery module. To this end, the housing must have a high mechanical rigidity. One possibility of ensuring a high mechanical stability and, as it were, reducing the component weight and the manufacturing costs is to stabilize a plastics housing with UD tapes integrated in a component matrix of plastic. For instance, a UD tape can be integrated helically in the component matrix. The production is preferably realized through overmolding of the UD tape by injection molding. A further advantage lies in the fact that the UD tapes—where an electrically conductive UD tape is used—can be heated up by application of an electric voltage. The housing is thereby able to be heated to a certain temperature. If, for instance, low external temperatures prevail, the temperature of the housing can be increased in order to spare the battery. By setting a specific temperature of the housing, for instance to 25° C., the battery may be heated, insofar as it assumes an operating temperature which lies above the temperature of the housing.

It should additionally be pointed out that terms such as "comprising" "have" or "having" do not preclude other features or steps. In addition, the terms "a" or "the" which refer to a single step or feature, do not preclude a plurality of features or steps, and vice versa.

Further advantages of this disclosure are explained in closer detail on the basis of the below-described illustrative embodiments. It should be understood that in the various figures, identical parts are provided with the same reference signs and are therefore also only described once.

FIG. 1 is a perspective view the body of a motor vehicle or a vehicle chassis. A disclosed embodiment includes a component 1 that is a transverse arch 100 of a vehicle roof. Roof transverse arches 100 can be installed between the A, B and C pillars of motor vehicles. As can be seen in FIG. 1, the transverse arches 100 can support the vehicle roof. FIG. 1 shows only a section 102 of a vehicle roof. Furthermore, the transverse arches 100 contribute significantly to the flexural and torsional rigidity of the vehicle chassis. The transverse arches 100 also serve to disperse transverse forces acting on the vehicle chassis. A tailgate or trunk door may be attached a roof transverse arch 100 provided in the rear region 104 of the vehicle. The transverse arch 100 is made, to a substantial proportion, of plastic. In comparison to metal transverse archest, plastic offers significant advantages in terms of a reduced component weight.

Figure 2:
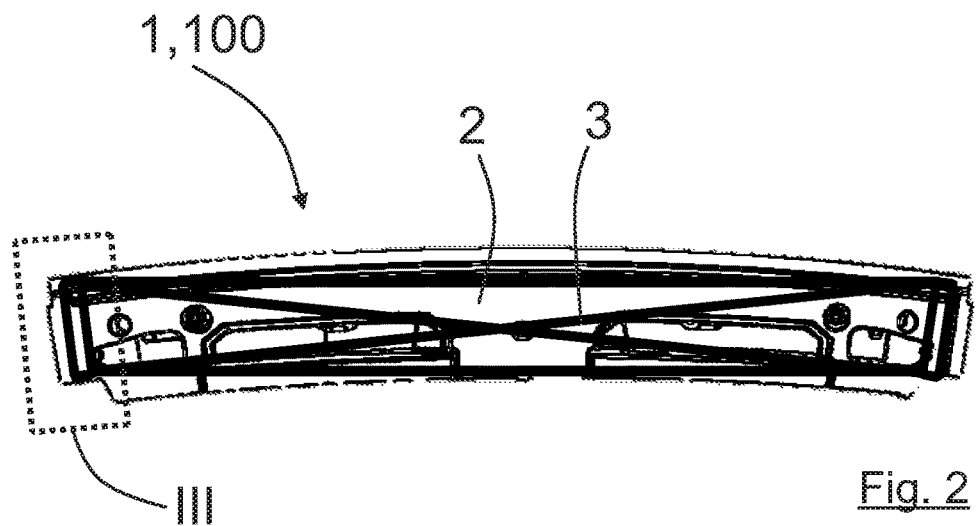
FIG. 2 is a longitudinal section along a transverse arch for a vehicle roof, along with a schematic illustration of the arrangement of a reinforcing element.

Referring to FIG. 2, the transverse arch 100 of a vehicle roof is represented in a simplified or schematized sectional representation. The transverse arch 100 shall here be regarded as a component 1 according to this disclosure and is subsequently also numbered as such in the Figures. The component 1 or the transverse arch 100 is composed of a plurality of components. Reinforcing elements 3 in the form of unidirectional (UD) tapes are integrated in a component main body 2 made of plastic and extend over the entire length of the transverse arch 100.

The UD tape or UD tapes can be arranged such that they intersect in the middle of the transverse arch 100. Also, the marginal regions extending along the transverse arch can be reinforced with the UD tapes or other reinforcing elements 3. At the ends of the transverse arch 100 is additionally provided a fixing or deflection element 6 made of metal.

Figure 3:
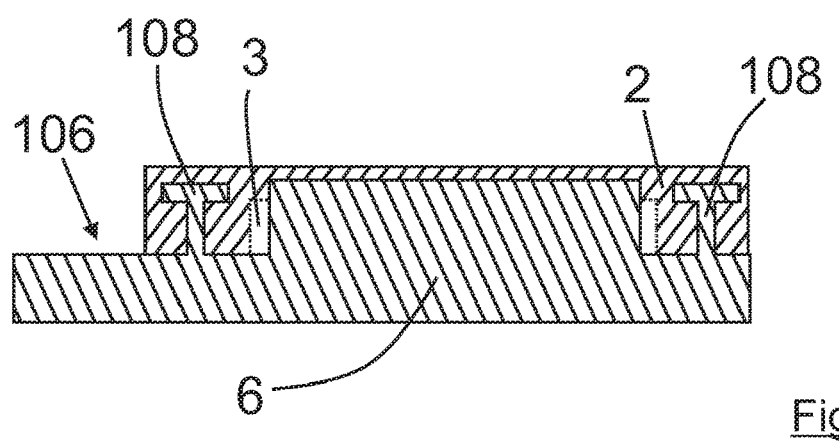
FIG. 3 is detail III from FIG. 2 in a cross-sectional view, in particular, the connection of a fixing and deflection element to the component main body the reinforcing element is represented.

Referring to FIG. 3, with continued reference to the other Figures, the fixing or deflection element 6 is not fully covered by a plastics compound forming the component main body 2. In the production of the roof transverse arch 100 by injection molding, a region 106 of the fixing or deflection element 6 is not overmolded with a plastics compound. The fixing or deflection element 6 is provided at both ends of the transverse arch 100. It should be borne in mind that the fixing or deflection element 6 extends only over a partial length of the transverse arch 100. The fixing or deflection element 6 provides for connection of the transverse arch 100 to the vehicle roof or to other components of the vehicle chassis by spot welding.

At the ends of the transverse arch 100, the reinforcing element 3 or UD tape is wound around the fixing or deflection element 6 and bears against this same (see FIGS. 2 and 3). The UD tape is hereby placed under tensile stress. Furthermore, an arrangement of this type enables a reversal of direction of the UD tape or reinforcing element.

As can further be seen from FIG. 3, the fixing or deflection elements 6 have additional connecting elements 108 in a T-shape. These can be an integral component part of the respective fixing or deflection element 6 and enable a particularly good connection to the overmolded plastics compound or the component main body 2. The fixing or deflection element 6 is preferably made of steel or aluminum.

Figure 4:
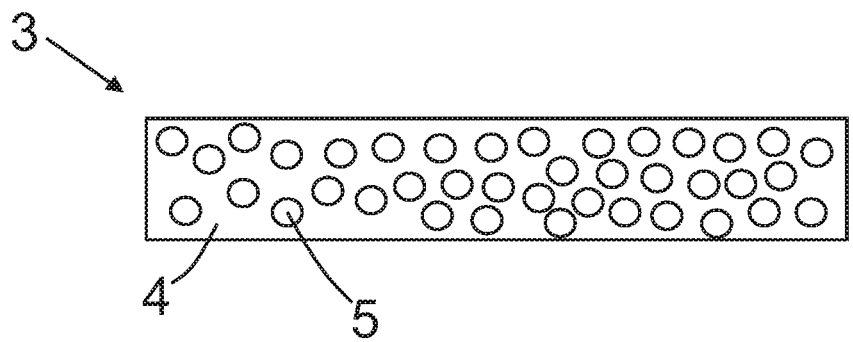
FIG. 4 is a schematic illustration of the structure of a unidirectional (UD) band, along with plastics matrix and fibers.

Referring to FIG. 4, the structure of a UD tape is represented in a schematized cross-sectional view and generally indicated at 3. As shown in FIG. 4, fibers 5 are embedded in a plastics matrix 4. The fibers 5 can be distributed homogeneously or statistically in the plastics matrix 4. In FIG. 4, a statistical distribution is represented. The fibers 5 can be electrically conductive fibers. The plastic matrix 4 can also be electrically conductive conducting, in particular by the embedment of electrically conductive filling materials.

Figure 5:
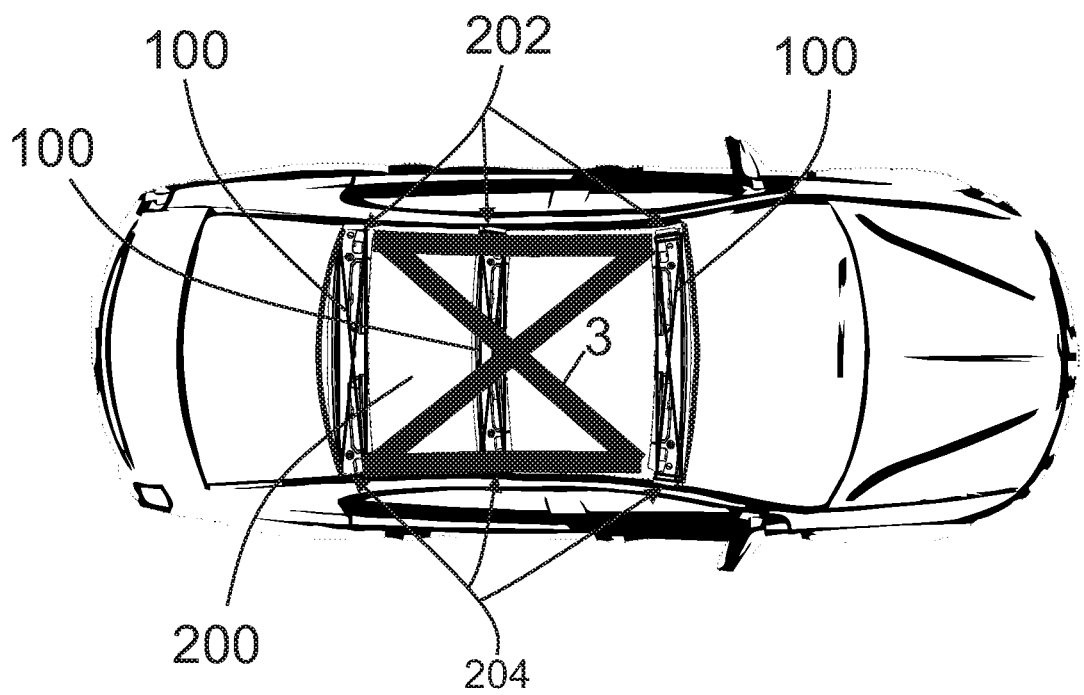
FIG. 5 is a representation of a vehicle roof in a schematized top view and reinforcement thereof with UD bands.
Figure 6:
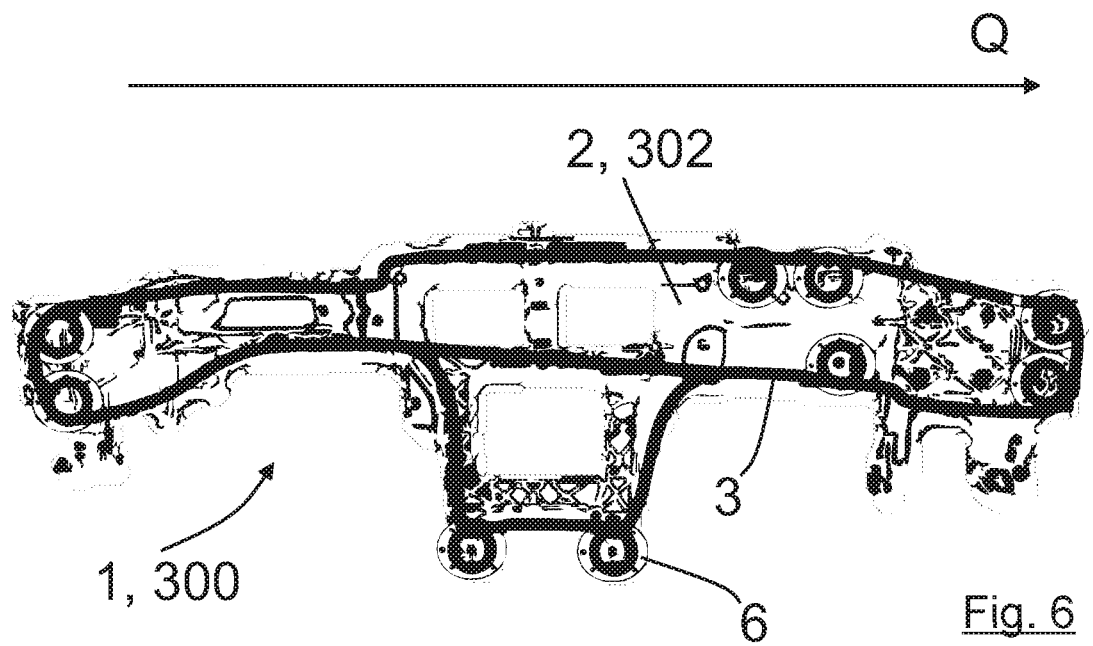
FIG. 6 is a longitudinal section along an axle beam for a motor vehicle.

Referring to FIGS. 5 and 6, another example component 1 according to a disclosed embodiment can be constituted by a vehicle roof 200. Such a vehicle roof 200 is typically positioned above the transverse arches 100 of the vehicle roof 200. At its marginal regions extending in the vehicle longitudinal direction, the vehicle roof 200 is generally fastened to roof rails. At several points 202, 204, the vehicle roof 200 rests on the transverse arches 100, or the vehicle roof 200 is connected to the transverse arches 100.

As represented in FIG. 5, a plastics roof main body 206 includes integrated reinforcing elements 3, for instance UD tapes. Furthermore, fixing or deflection elements 6 can be integrated in a component matrix of the roof, or fastened to the roof.

The vehicle roof 200 is preferably manufactured together with the roof transverse arches 100 as a common component 1, namely in that, the reinforcing elements 3 and the fixing and deflection elements 6 are placed in a die and overmolded by a plastics compound. The die can be tailored to the desired shape of the vehicle roof 200 and of the transverse arches 100. Vehicle roof 200 and transverse arches 100 form a common component. The fixing and deflection elements 6 are designed analogously to that fixing and deflection element 6 such as is represented in FIG. 3.

The UD tape or reinforcing element 3 extending through the vehicle roof 200 can be fastened, jointly with the UD tape extending through the transverse arches 100, to one and the same fixing and deflection element 6. A part of the vehicle roof 200 can be made, moreover, of a transparent plastic, for instance a transparent thermoplastic plastic. Also, the whole of the vehicle roof 200 can be made of a transparent plastic. In a transparent vehicle roof of this kind, a LED display, in particular a transparent organic LED Display (tOLED or TOLED), can be integrated.

Figure 7:
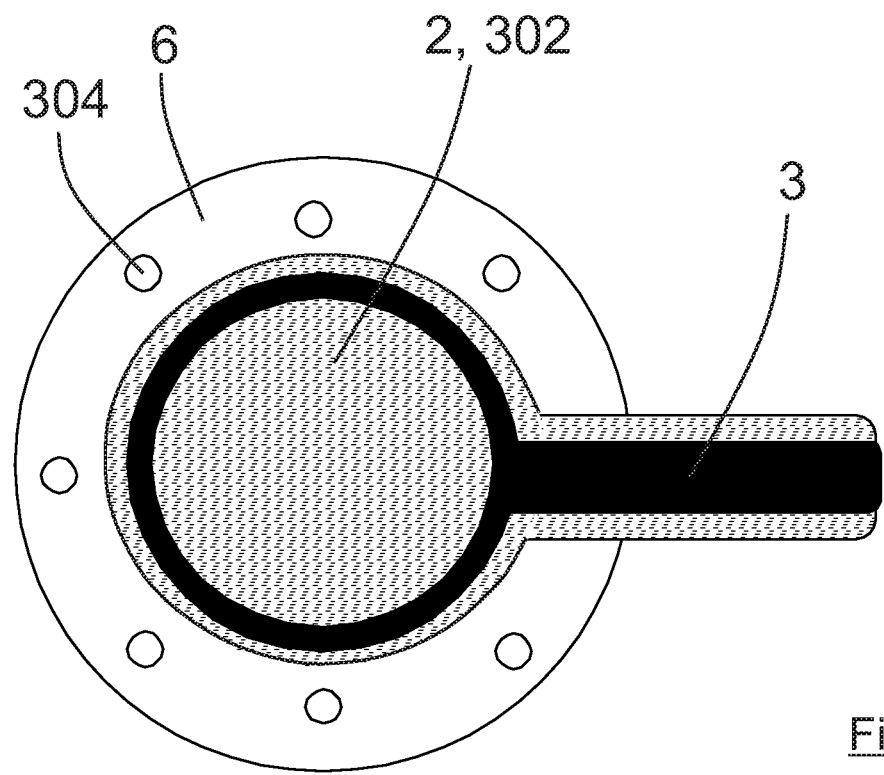
FIG. 7 is a schematic sectional representation of the connection of a fixing and deflection element to an axle main body as shown in FIG. 6 and to a reinforcing element.

Referring to FIG. 7, another example embodiment of the component 1 can further be constituted by a vehicle axle 300, in particular by an axle beam 302 running in the transverse direction Q of a vehicle. The axle beam 302 provides a component main body 2 made of plastic. In the component main body 2 or an associated component matrix fixing or deflection elements 6 made of aluminum are integrated, similarly UD tapes 3 are a component part of the axle beam 302. These are likewise integrated in the component matrix and can be arranged in any chosen manner. As represented, in particular an arrangement of the reinforcing elements 3 along the marginal regions of the axle beam 302 is expedient. For, in particular the marginal regions of a plastics axle beam of this kind can be mechanical weak points of the component 300.

The tapes 3 and fixing or deflection elements 6 are, in a single step, overmolded by a plastics compound, namely by means of an injection molding process. Also in a vehicle axle 300 as a component according to the disclosure, the reinforcing elements 3 integrated in the component are wound around the fixing or deflection elements 6 and, as a result of the wrapping, undergo a change of direction or reversal of direction. The fixing or deflection elements 6 ensure an accurate positional arrangement of the tapes 3 prior to the injection molding process and enable a stable fixing of the tapes.

Furthermore, the fixing or deflection elements 6 are possible attachment points for further components. A partial region of the fixing or deflection elements 6 can remain excluded from an overmolding with plastics material. Here, a direct attachment of further components, for instance via a weld joint, can be realized. As represented in FIG. 7, the fixing or deflection elements 6, when used with an axle beam 302, preferably have a round shape. In the deflection or fixing element, hole openings 304 can be integrated.

Figure 8:
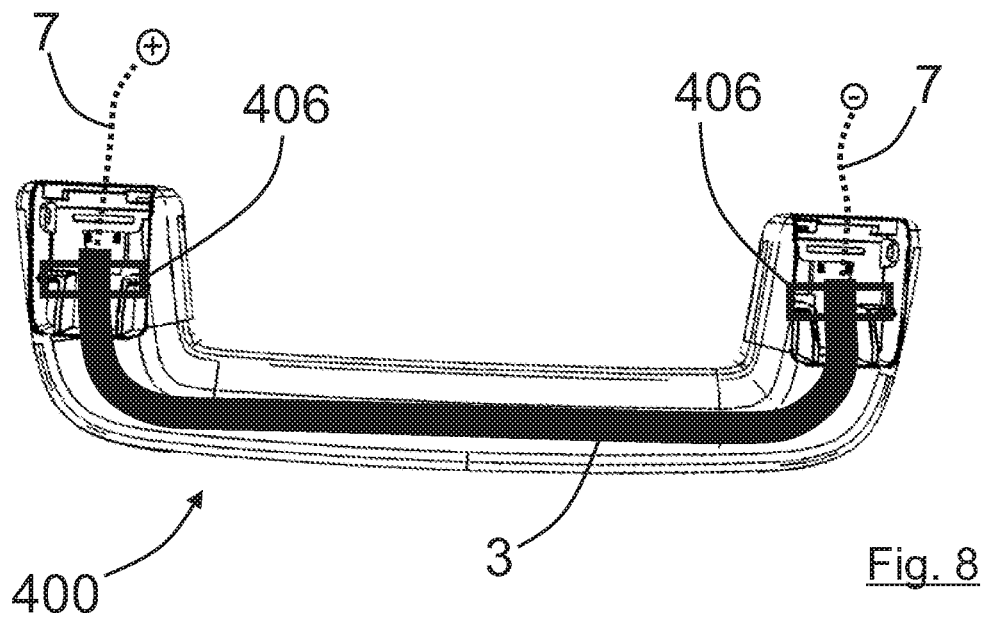
FIG. 8 is a side view of a grab handle for arrangement in the vehicle interior, along with a schematic illustration of the arrangement of a reinforcing element and electrical contact.

Referring to FIG. 8, another example component 1 can further be constituted by a grab handle 400 for arrangement in the vehicle interior. The grab handle 400 can here be arranged on the vehicle roof or on a vehicle pillar. The grab handle 400 is in its longitudinal direction designed in an arc shape or U-shape. With its ends 402, 404, the grab handle 400 is fastened to the vehicle chassis. As is represented, the grab handle 400 produced from plastic is reinforced with a unidirectional band (UD tape) as the reinforcing element 3. The UD tape extends along the grab handle, from one end region to a further end region. Such a component is produced by injection molding. To this end, in a die, connecting elements 406 of metal can be connected to the tape ends and overmolded with an injection molding compound, preferably with a plastic. Via the connecting elements 406, the grab handle 400, moreover, can be connected to the vehicle, for instance to the vehicle roof. In FIG. 8, the connecting elements 406 are depicted only in heavily schematized representation, since the size and shape or the concrete design of the connecting elements is not the subject of the present disclosure.

In the installed state of the grab handle 400, the UD tape can be connected via a contact means 7 to an electrical voltage source 8. The voltage source 8 can be a component part of the vehicle electronics. Following the application of an electric voltage to the UD bands 3 arranged in the component, more specifically the grab handle 400, these heat up and transfer the herein generated heat to their surroundings. The grab handles 400 can thus be reinforced with the UD bands 3 and heated.

Figure 9:
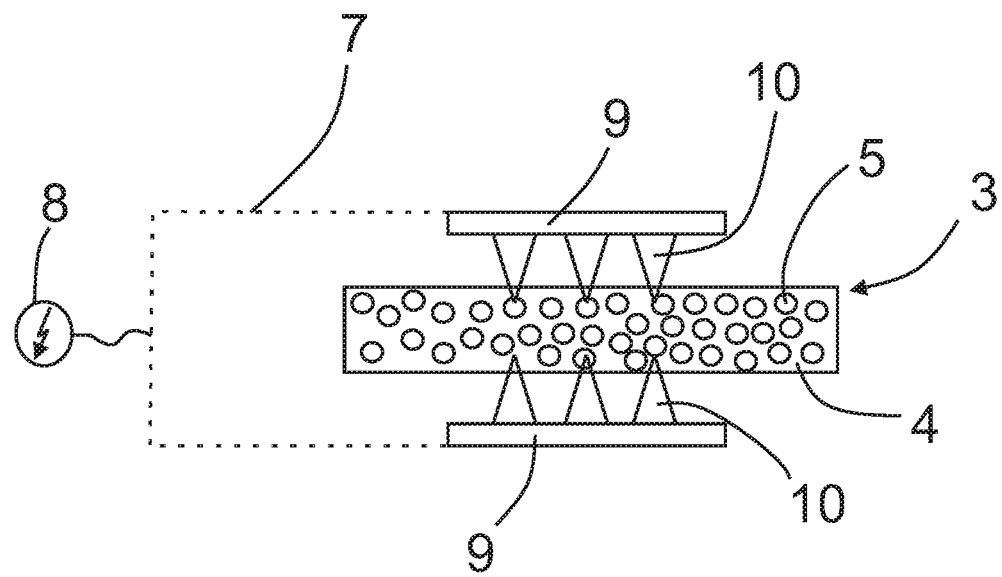
FIG. 9 is an exemplary representation of the electrical contact of a reinforcing element.

Referring to FIG. 9, an example embodiment of a contact means is represented and schematically indicated at 7. The example contact means 7 can be of clamp-like design and respectively comprise two carrier plates 9 having contact pins or teeth 10 arranged thereon. The contact pins or teeth 10 can penetrate at least partially through the UD tape and the electrically conductive component parts provided therein, thus make contact with the fibers 5 or electrically conductive filling materials in the plastics matrix 4. The contact means 7 can be designed in any manner which enables contacting of the UD tape 3. The contact means 7 are not limited to a clamp-like design. As represented in FIG. 8, one end of the UD tape 3 is connected to a plus pole, and a further end of the UD tape 3 to a minus pole of a voltage source 8. Accordingly, a contact means 7 is provided at each tape end.

Figure 10:
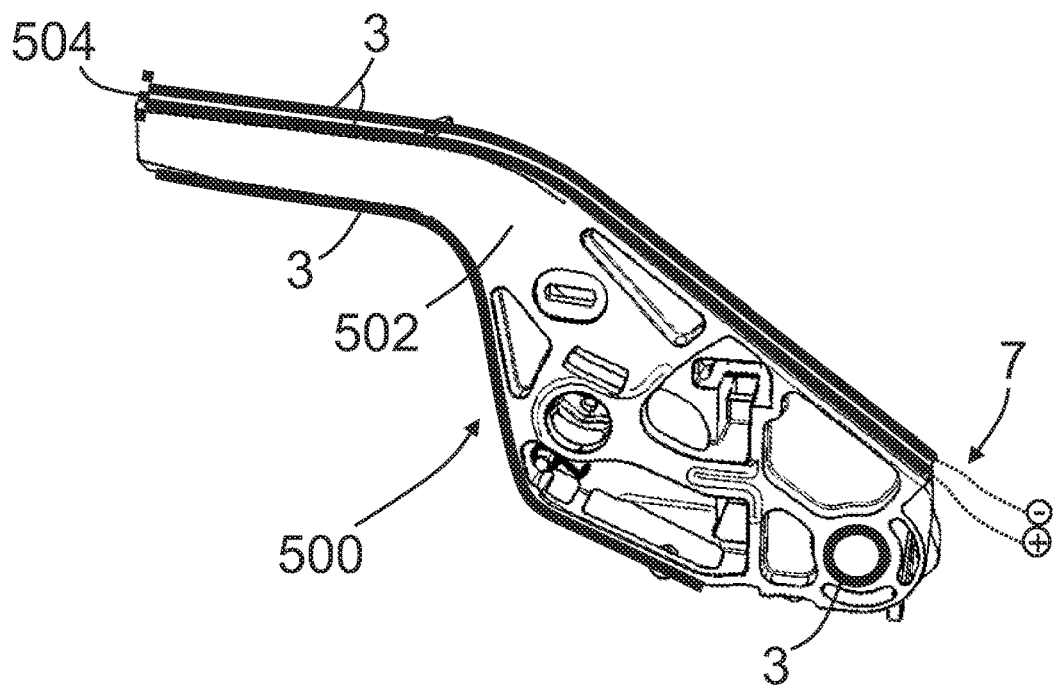
FIG. 10 is a perspective view of a handle of a hand brake or parking brake of a motor vehicle, along with a schematic illustration of reinforcing elements and the electrical contact.

Referring to FIG. 10, another example component 1 can be constituted by the handle 500 for a parking brake or hand brake of a motor vehicle. For the manufacture of such a handle, one or more UD bands 3 having integrated electrically conductive fibers can be arranged on a thermoplastic semi-finished product and overmolded with a plastics compound.

In FIG. 10, a handle 500 having two UD bands arranged in parallel on the top side of a handle main body 502 is represented. At the same time, the UD bands which as reinforcing elements 3, as well as heating elements. At one end 504, the parallel arranged bands 3 are connected to one another via electrical conductive connecting means 504. In addition, the bands 3 are connected via a contact means 7 to an electrical voltage source. The voltage source can be a component part of the vehicle electronics.

Following the application of an electric voltage to the UD bands 3 arranged in the composite component, more specifically the handle 500 of the parking brake or hand brake, these heat up and transfer the herein generated heat to their surroundings. In order to transport the heat as efficiently as possible outward, i.e. in the direction of the surface of the handle 500, and at the same time to ensure an acceptable handle, the handle 500 can be at least partially encased by a thermally conductive elastomer (not represented).

Figure 11:
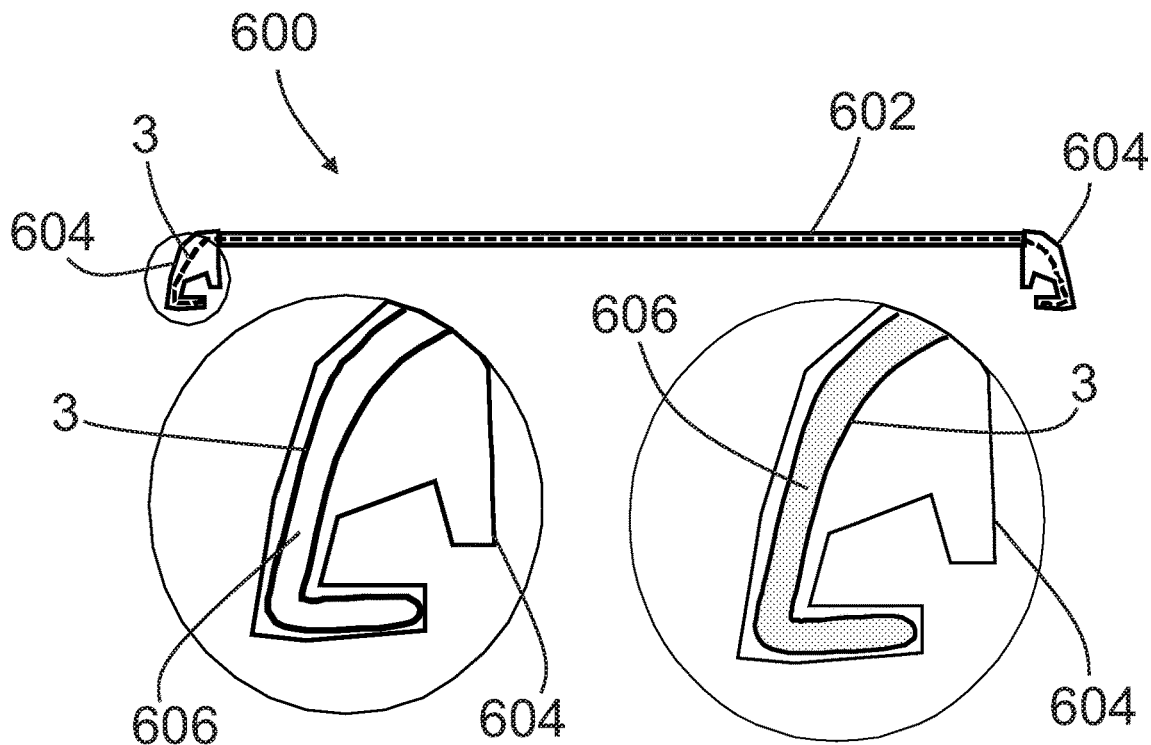
FIG. 11 is a schematized sectional representation along a roof rack, and an enlarged representation of the structure in the region of an adapter element in two construction variants.

Referring to FIG. 11, another example embodiment of the component can be constituted by a roof rack 600 for a motor vehicle. As represented, such a roof rack 600 comprises a transverse strut 602. The transverse strut 602 may extend over the vehicle roof and be fastened to the roof structure of the vehicle by suitable adapters 604. Generally, a plurality of transverse struts 602 are provided for the formation of a roof rack arrangement on a vehicle roof.

According to an example embodiment, the roof rack 600, thus the transverse struts 602 along with adapter 604, can be configured as a plastics component having therein integrated UD tapes as the reinforcing elements 3. Metallic adapters 604 can also be combined with a transverse strut 602 made of plastic. The UD tape 3 can here extend along the transverse strut 602 and additionally be fixed in the adapters 604.

Production is realized by injection molding through overmolding of the UD tape. In the roof rack 600, for instance the transverse strut 602, can be provided additional ribs, which further increase the rigidity of the roof rack 600. As represented in the enlarged details of the adapter 604, the UD tape can extend along a core element 606, likewise integrated in the roof rack 600, or be wound around the element. The core element can be constituted by a 'dichloroethyl sulfide core' (represented on the left) or by a foam core (represented on the right). The shape and size of the core during the injection molding jointly determines the shaping of the roof rack which is to be produced. In one example embodiment, the UD tape 3 can also be integrated into a roof rack 600 by means of "additive manufacturing".

Figure 12:
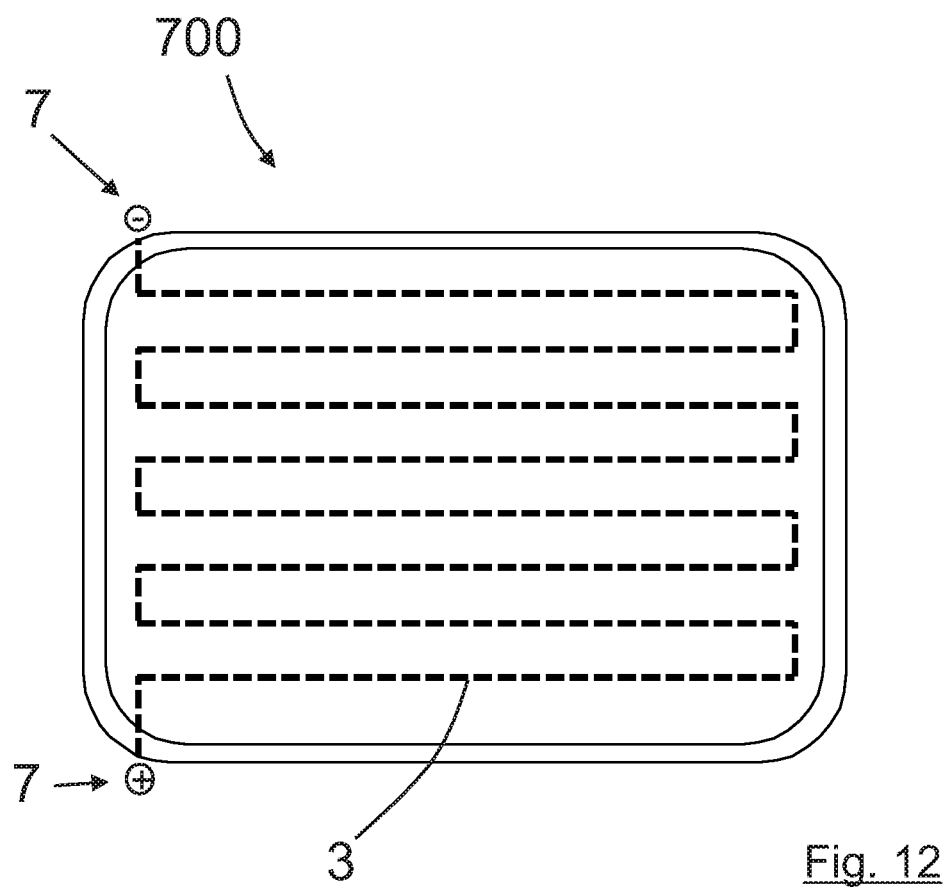
FIG. 12 is a top view a schematized representation of a housing for the arrangement of a battery module, along with a schematic illustration of a possible path of a reinforcing element integrated in the housing.

Referring to FIG. 12, another example component can be constituted as a housing 700 of a battery module. The battery module can be constituted, for instance, by a battery module for an electric vehicle. A plurality of battery units can be amalgamated into a battery module and arranged in the housing 700. Such a housing can be arranged, for instance, directly under the vehicle floor, or be integrated therein. In FIG. 12, a schematic top view of a housing 700, made of plastic, for a battery module is represented. Embedded in the plastics housing matrix is a UD tape as the reinforcing element 3. In the depicted representation, the UD tape 3 is integrated helically in the component matrix.

The production of such a housing 700 is preferably realized through overmolding of the UD tape 3 by injection molding. At its ends, the UD tape is connected via contact means 7 to an electrical voltage source of the vehicle. Through the application of an electric voltage, the UD tape, and hence the housing 700, can be heated up. As a result, the housing 700 is able to be brought to a certain temperature. If, for instance, low external temperatures prevail, the temperature of the housing 700 can be increased in order to spare the battery. Through the setting of a specific temperature of the housing 700, for instance to 25° C., the battery can be cooled insofar as it assumes an operating temperature which lies above the temperature of the housing 700.

The method underlying this disclosure, and the fastening element likewise can be combined with all previously described advantageous embodiments, wherein the cited features can be present singly or in any chosen combination.

Directional terms such as "fore," "aft," "transverse," "longitudinal," "vertical," "front," "rear," "side," etc., are used herein with reference to the normal operational attitude of a motor vehicle. It should be understood that terms such as "generally," "substantially," and "about" are not intended to be boundaryless terms, and should be interpreted consistent with the way one skilled in the art would interpret those terms.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component for a motor vehicle comprising:
   a component main body including a component matrix and a fixing element; and
   a reinforcing element integrated into the component matrix and attached to the fixing element, wherein the reinforcing element comprises a unidirectional tape with a plurality of unidirectionally orientated fibers embedded within a thermoplastic matrix, the unidirectional tape is wound around a portion of the fixing element and placed under a tensile stress.

2. The component as recited in claim 1, wherein the fixing element includes a connecting component.

3. The component as recited in claim 2, wherein the fixing element comprises one of a steel and aluminum.

4. The component as recited in claim 3, wherein the component comprises a roof transverse arch and the fixing element is provided at ends of the transverse arch for connection to a vehicle roof structure.

5. The component as recited in claim 4, wherein the component comprises a vehicle roof attached to the roof transverse arch.

6. The component as recited in claim 5, wherein the vehicle roof and the roof transverse arch form common component.

7. The component as recited in claim 6, wherein the unidirectional tape extends through the roof transverse arch and is secured to each fixing element provided at ends of the roof transverse arch.

8. The component as recited in claim 7, wherein the roof transverse arch comprises at least two transverse arches with the fixing elements at ends of each of the at least two transverse arch and the unidirectional tape extends between the at least two transverse arches and is fixed to the fixing elements at the ends.

9. The component as recited in claim 8, wherein the unidirectional tap is crossed over at least one of the at least two transverse arches.

10. The component as recited in claim 6, wherein the vehicle roof includes a portion formed from a transparent plastic material.

11. The component as recited in claim 10, wherein a visible display is integrated into the vehicle roof.

12. The component as recited in claim 6, wherein the fixing element comprises a T-shape that is disposed at ends of the transverse arch.

13. The component as recited in claim 6, wherein the fixing element is formed from one of steel or aluminum.

14. The component as recited in claim 1, wherein the unidirectionally orientated fibers comprise an electrically conductive carbon material.

15. The component as recited in claim 1, wherein the plurality of unidirectional fibers are unidirectionally orientated continuous fibers.

16. The component as recited in claim 1, wherein the unidirectional fibers are distributed statistically within the thermoplastic matrix.

17. The component as recited in claim 1, wherein the unidirectional fibers are distributed homogenously within the thermoplastic matrix.

* * * * *